(12) United States Patent
Herrada

(10) Patent No.: US 10,432,114 B2
(45) Date of Patent: Oct. 1, 2019

(54) ELECTRIC MOTOR, GEAR MOTOR, WIPING SYSTEM AND ASSOCIATED CONTROL METHOD

(71) Applicant: Valeo Systèmes d'Essuyage, Le Mesnil Saint Denis (FR)

(72) Inventor: Jose-Luis Herrada, Le Mesnil Saint Denis (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 0 days.

(21) Appl. No.: 15/936,562

(22) Filed: Mar. 27, 2018

(65) Prior Publication Data
US 2018/0294750 A1   Oct. 11, 2018

(30) Foreign Application Priority Data
Mar. 27, 2017   (FR) ...................................... 17 52535

(51) Int. Cl.
*H02P 6/08* (2016.01)
*H02P 6/10* (2006.01)
(Continued)

(52) U.S. Cl.
CPC ....... *H02P 6/08* (2013.01); *B60S 1/08* (2013.01); *B60S 1/166* (2013.01); *B60S 1/26* (2013.01);
(Continued)

(58) Field of Classification Search
CPC ...... H02P 1/00; H02P 1/04; H02P 1/24; H02P 1/26; H02P 1/46; H02P 1/465; H02P 6/00;
(Continued)

(56) References Cited

U.S. PATENT DOCUMENTS

| 6,051,943 A * | 4/2000 | Rabin | H02P 6/16 318/400.09 |
| 6,239,564 B1 * | 5/2001 | Boe | H02P 6/14 318/400.1 |
| 8,917,041 B2 * | 12/2014 | Kishimoto | H02P 6/16 318/400.14 |

FOREIGN PATENT DOCUMENTS

EP   2840700 A1   2/2015

OTHER PUBLICATIONS

Ruiqing Ma et al.; "A Novel Sinusoidal Current Driving Method for BLDCM Based on SVPWM"; IEEE International Conference on Electrical Machines and Systems (ICEMS); pp. 732-735; 2010 (4 pages).

(Continued)

*Primary Examiner* — Antony M Paul
(74) *Attorney, Agent, or Firm* — Osha Liang LLP

(57) ABSTRACT

A brushless direct current electric motor for a wiping system. The brushless direct current electric motor includes a rotor, a stator, a Hall effect sensor to detect control magnet angular position of the rotor, and a control unit to determine rotor angular positions in relation to the stator from the signals Hall effect sensor signals and to generate control signals to electromagnetic excitation coils of the rotor as a function of the determined angular position of the rotor. The control unit includes a clock configured to: estimate the angular position of the rotor at predetermined instants lying between two changes of state of the Hall effect sensor, determine values of the control voltages associated with the angular positions of the rotor estimated for the predetermined instants, and generate a substantially sinusoidal control signal from the determined voltage values.

16 Claims, 4 Drawing Sheets

Figure 1:
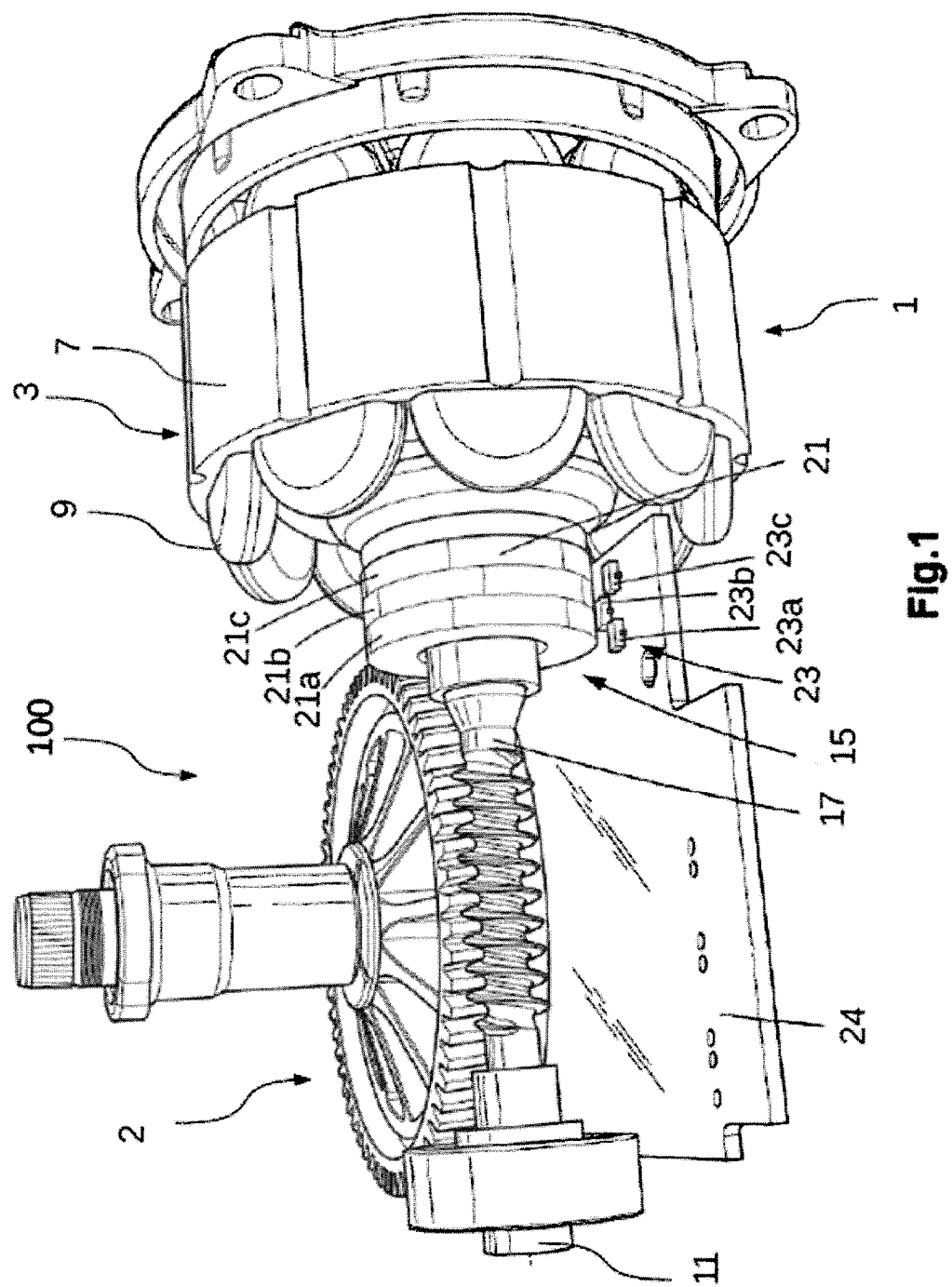

(51) Int. Cl.
*H02P 6/16* (2016.01)
*H02K 11/215* (2016.01)
*B60S 1/08* (2006.01)
*B60S 1/16* (2006.01)
*B60S 1/26* (2006.01)
*H02K 7/116* (2006.01)
*H02P 6/22* (2006.01)

(52) U.S. Cl.
CPC ........... *H02K 7/116* (2013.01); *H02K 11/215* (2016.01); *H02P 6/10* (2013.01); *H02P 6/16* (2013.01); *H02P 6/22* (2013.01); *H02P 2207/05* (2013.01)

(58) Field of Classification Search
CPC ...... H02P 6/04; H02P 6/06; H02P 6/12; H02P 6/145; H02P 6/14; H02P 7/00; H02P 7/0066; H02P 21/00; H02P 27/04; H02P 27/06; H02P 23/00; H02P 27/00; H02K 29/08; H02K 29/12
USPC ..... 318/400.01, 400.02, 700, 701, 727, 779, 318/799, 800, 801, 430, 432, 437, 400.37, 318/400.38, 400.39; 388/800, 921
See application file for complete search history.

(56) References Cited

OTHER PUBLICATIONS

Sreejith Kumar N. et al.; "Quasi sinusoid commutation for BLDC motor—A Simplified Approach on 16 bit microcontroller platform"; IEEE International Conference on Power Electronics, Drives and Energy Systems (PEDES); pp. 1-9; 2012 (10 pages).

Kim Jonghwa et al.; "Position Estimation Using Linear Hall Sensors for Permanent Magnet Linear Motor Systems"; IEEE Transactions of Industrial Electronics; vol. 63, No. 12; pp. 7644-7652; 2016 (9 pages).

* cited by examiner

ELECTRIC MOTOR, GEAR MOTOR, WIPING SYSTEM AND ASSOCIATED CONTROL METHOD

The present invention relates to an electric motor and in particular an electric motor of a gear motor for motor vehicle wiping systems.

Different types of electric motors can be used in a gear motor and in particular brushless direct current electric motors which offer numerous advantages such as a long life, reduced bulk and consumption and a low sound level.

However, the control of the brushless direct current electric motors is more complex compared to the electric motors with brushes because, to allow a good operation, it is necessary to accurately know the angular position of the rotor of the brushless direct current electric motor.

Indeed, such electric motors comprise electromagnetic excitation coils arranged on the stator and powered alternatively via an inverter to make it possible to drive permanent magnets arranged on the rotor.

There are three types of control for switching the switches of the inverter and powering the electromagnetic excitation coils:
- blockwise control by using, for example, three Hall effect sensors to determine the angular positions of the rotor at the instants of the switching changes,
- sensorless control, in which a predefined sequence is applied on start up then the angular position of the rotor is determined from the counter-electromotive forces measured when the rotation speed is sufficient, but this control does not allow start ups with a high torque,
- sinusoidal control which makes it possible to increase the torque constant and have a gentler regulation which makes it possible to reduce the noise, but this control requires an accurate encoder for determining the angular position of the rotor at each instant which makes this solution costly.

In the case of an electric motor intended to be used in a gear motor of a wiping system for a motor vehicle, it is best to have at the same time an electric motor that makes it possible to perform a start up with a high torque (for example in the case of a wiper blade stuck by dirt or by ice), an electric motor that makes it possible to have a high torque with high rotation speed (in the case of a dry windshield), a motor emitting a low noise and having a reduced cost price.

The present invention therefore aims to provide a solution to allow an effective control of a gear motor for a wiping system that can supply a high torque on start up and at high speed while limiting the operating noise and the cost price.

To this end, the present invention relates to a brushless direct current electric motor, in particular for a wiping system, comprising:
- a rotor comprising a control magnet,
- a stator having electromagnetic excitation coils of the rotor,
- at least one Hall effect sensor configured to detect an angular position of the control magnet,
- a control unit connected to said Hall effect sensor and configured to determine at least one angular position of the rotor in relation to the stator from the signals from the Hall effect sensor and to generate control signals to power the electromagnetic excitation coils of the stator as a function of the determined angular position of the rotor, in which the control unit comprises a clock and is configured to:
- estimate the angular position of the rotor at a plurality of predetermined instants lying between two changes of state of the Hall effect sensor from the instants of the preceding changes of state,
- determine values of the control voltages associated with the angular positions of the rotor estimated for the predetermined instants, said voltage values making it possible to generate a sinusoidal or substantially sinusoidal control signal,
- generate a sinusoidal or substantially sinusoidal control signal from the determined voltage values.

The estimation of an angular position of the rotor at intermediate instants between the signals transmitted by a Hall effect sensor makes it possible to replicate an accurate encoder for a low cost and thus allow a sinusoidal control signal to be generated without needing to use a costly accurate encoder.

The present invention relates also to the following aspects which can be combined to provide again The control unit is configured to generate a blockwise control signal from the changes of state of the, at least one, Hall effect sensor for rotation speeds below a first predetermined threshold and to generate a substantially sinusoidal control signal for rotation speeds above the first predetermined threshold.

The control unit is configured to generate a sinusoidal control signal with a predetermined phase advance when the rotation speed exceeds a second predetermined threshold.

The first predetermined threshold corresponds to a rotation speed equal to 10% of the maximum rotation speed.

The control unit is configured to generate a sinusoidal control signal with a predetermined phase advance when the torque to be supplied is above a predetermined threshold.

The electric motor comprises at least two Hall effect sensors and the control unit is configured to generate a substantially sinusoidal control signal from the signal supplied by just one of the Hall effect sensors.

The present invention relates also to a gear motor, in particular for a wiping system, comprising an electric motor as described previously coupled to a reduction gear.

The present invention relates also to a wiping system, in particular for a motor vehicle, comprising a gear motor as described previously.

The present invention relates also to a method for controlling a brushless direct current electric motor, in particular for a wiping system, comprising:
- a rotor comprising a control magnet,
- a stator having electromagnetic excitation coils of the rotor,
- at least one Hall effect sensor configured to detect an angular position of the control magnet,
- a control unit connected to said Hall effect sensor and configured to determine an angular position of the rotor in relation to the stator from the signals from the Hall effect sensor and to generate control signals to power the electromagnetic excitation coils of the stator as a function of the determined angular position of the rotor, in which the method comprises the following steps:
- the angular position of the rotor is estimated at a plurality of predetermined instants lying between two changes of state of the Hall effect sensor from the instants of the preceding changes of state,
- the values of the control voltages associated with the angular positions of the rotor estimated for the predetermined instants are determined, said voltage values making it possible to generate a substantially sinusoidal control signal, a substantially sinusoidal control signal is generated from the determined voltage values.

The method also comprises the following aspects:

The step of estimation of the angular position of the rotor at a plurality of predetermined instants lying between two changes of state of the Hall effect sensor is performed from the instants of the two preceding changes of state of the Hall effect sensor assuming that the rotation speed is constant.

The step of estimation of the angular position of the rotor at a plurality of predetermined instants lying between two changes of state of the Hall effect sensor is performed from the instants of at least three preceding changes of state of the Hall effect sensor to take account of a change in the rotation speed of the rotor.

The method comprises a preliminary step of saving a mapping table between angular positions of the rotor and associated control voltages to obtain a substantially sinusoidal control signal and the step of determination of the values of the control voltages associated with the angular positions of the rotor comprises the search for these values in the saved mapping table.

The method comprises a step in which a substantially sinusoidal control signal is generated with a predetermined phase advance when the rotation speed of the rotor exceeds a second predetermined threshold.

The method comprises a step in which a substantially sinusoidal control signal is generated with a predetermined phase advance when the torque to be supplied is above a predetermined threshold.

The control signal with a phase advance is obtained by introducing a time offset for the application of the determined control voltages.

For rotation speeds below a first predetermined threshold, a blockwise control signal is generated from the changes of state of at least one Hall effect sensor and for rotation speeds above the first predetermined threshold, a substantially sinusoidal control signal is generated from the signals derived from a single Hall effect sensor according to the control method described previously.

Figure 2:
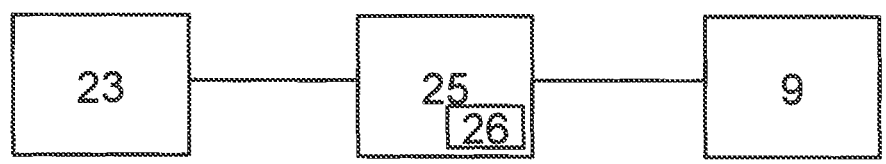
Figure 6:
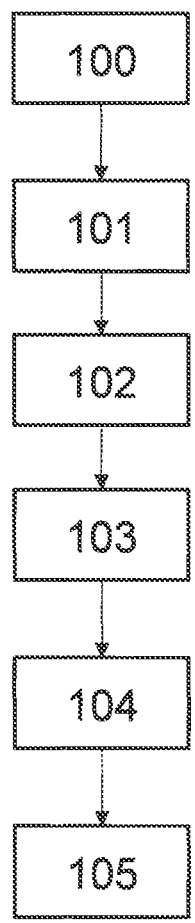
Figure 3A:
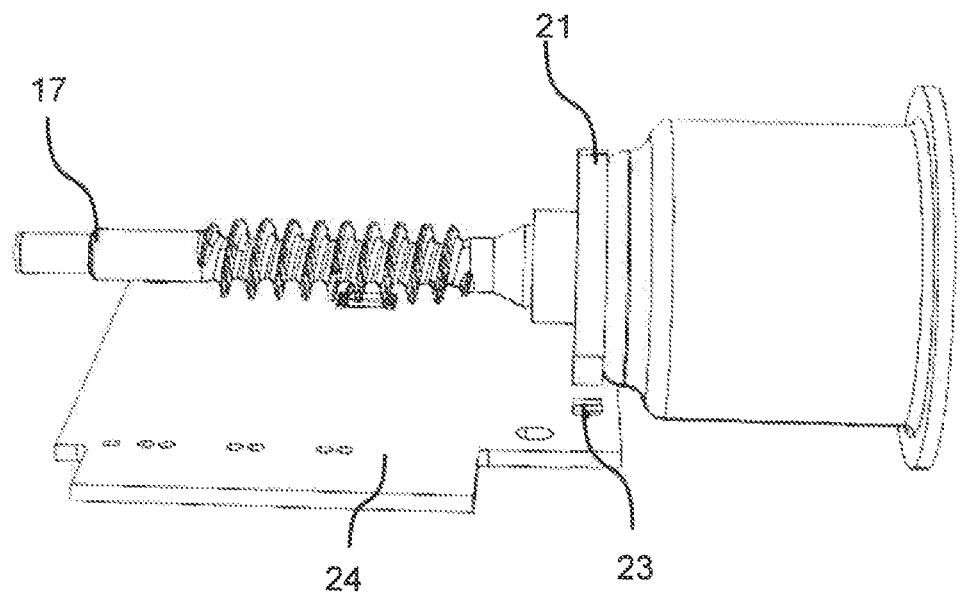
Figure 3B:
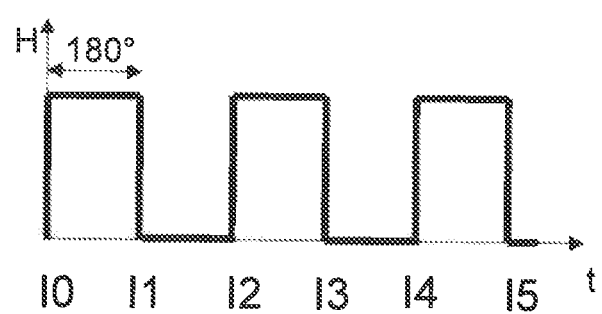
Figure 4:
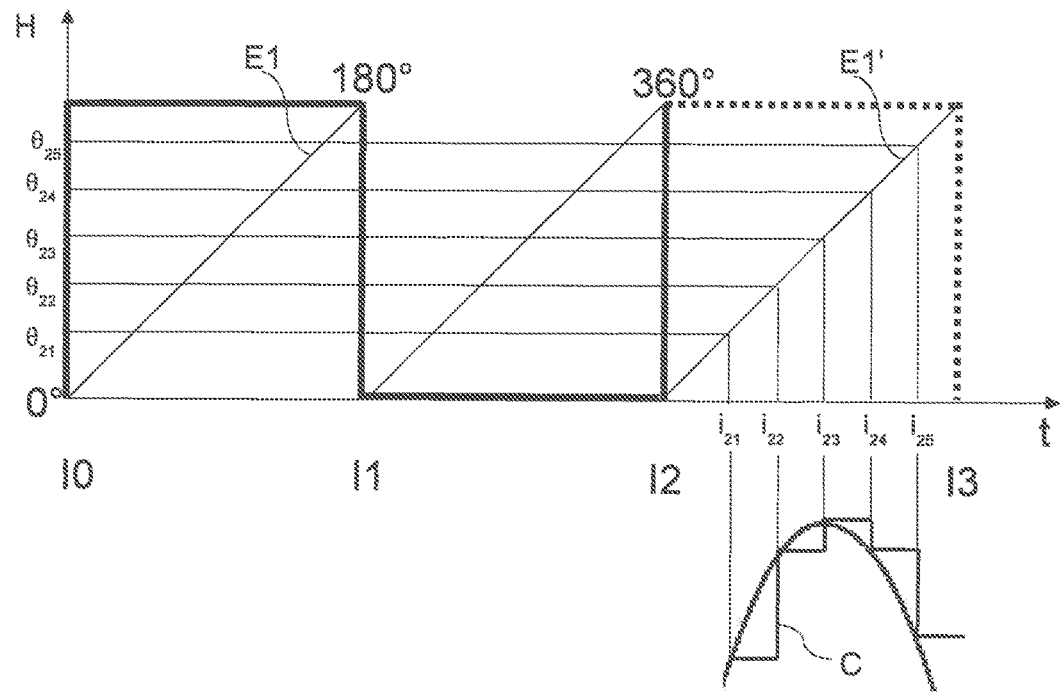
Figure 5:
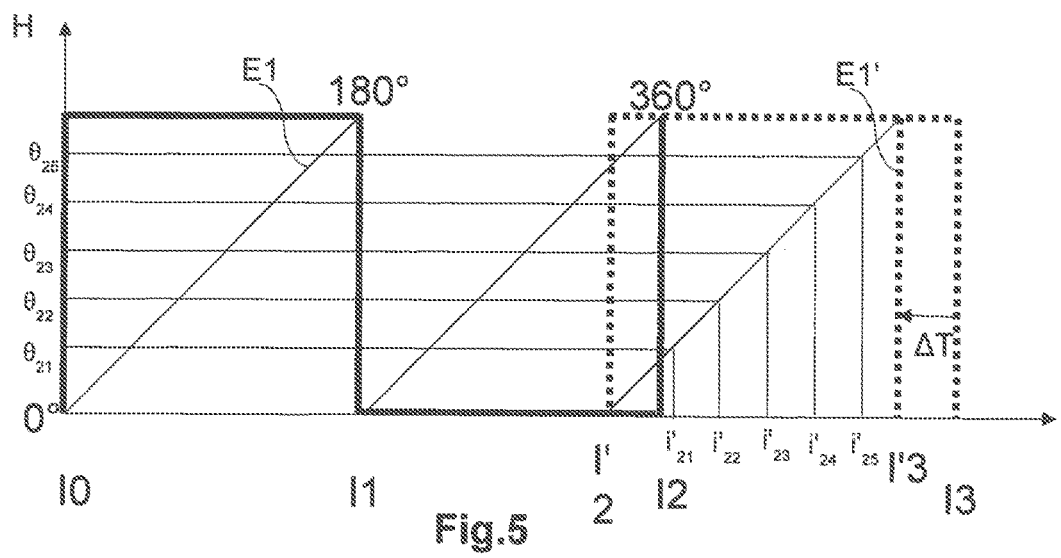

Other features and advantages of the invention will emerge from the following description, given by way of example and in a nonlimiting manner, in light of the attached drawings in which:

FIG. 1 represents a diagram of a perspective view of a brushless direct current electric gear motor, FIG. 2 represents a diagram of a control unit linked to a Hall effect sensor and to electromagnetic excitation coils;

FIGS. 3a and 3b respectively represent a perspective view of a control magnet associated with a Hall effect sensor and of the signal supplied by the Hall effect sensor during a rotation of the control magnet, FIG. 4 represents a diagram of the signal supplied by a Hall effect sensor as a function of time during a rotation of the control magnet, the signal estimated for the next cycle and the control signal obtained for the next cycle, FIG. 5 represents a diagram of the signal supplied by a Hall effect sensor as a function of time during a rotation of the control magnet and the signal estimated for the next cycle temporally offset, and FIG. 6 represents the different steps of a method for controlling a brushless direct current electric motor.

In all the figures, the identical elements bear the same reference numbers.

The following embodiments are examples. Although the description refers to one or more embodiments, this does not necessarily mean that each reference relates to the same embodiment or that the features apply only to a single embodiment. Simple features of different embodiments can also be combined or interchanged to provide other embodiments.

FIG. 1 represents a perspective schematic view of a gear motor 100 comprising an electric motor 1 and a reduction gear 2 and intended to drive, for example, a motor vehicle wiping system.

The electric motor 1 comprises a stator 3 comprising stator plates 7 generally surrounded and protected by a yoke frame (not represented). The stator plates 7 are configured to receive electromagnetic excitation coils 9. The electric motor 1 also comprises two bearings (only one of the bearings 11 is visible in FIG. 1) arranged at the two ends of a motor shaft 17. The bearings 11 make it possible to ensure the mechanical link between the stator 3 and a rotor 15. Permanent magnets (not represented) are arranged on the motor shaft 17. In the mounted state of the electric motor 1, the permanent magnets are configured to come to be positioned facing the electromagnetic excitation coils 9. Thus, the powering of the electromagnetic excitation coils 9 with suitable control signals makes it possible to create a revolving field which provokes the rotation of the rotor 15 via the permanent magnets.

Also, in order to be able to establish suitable control signals, it is necessary to know the angular position of the rotor 15. For that, the electric motor 1 also comprises a control magnet 21 mounted on the motor shaft 17. The control magnet 21 is multipole and comprises at least one pair of magnetic poles. In the mounted state, the control magnet 21 is intended to come to be positioned facing at least one Hall effect sensor 23. The Hall effect sensor 23 is for example positioned on a printed circuit board 24 fixed to the stator 3. The control magnet 21 can comprise several axial multipole layers if several Hall effect sensors 23 are used. In the present case, three Hall effect sensors denoted 23a, 23b and 23c are associated respectively with three axial multipole layers denoted 21a, 21b and 21c of the control magnet 21.

The number of Hall effect sensors 23 generally lies between 1 and 3. The Hall effect sensor(s) 23 is (are) configured to detect a magnetic pole of the control magnet 21 and consequently an angular position of the control magnet 21.

The electric motor 1 also comprises a control unit 25, represented in FIG. 2, and configured to receive the signals generated by the Hall effect sensor(s) 23 and to determine an angular position of the rotor 15 from the signals derived from said Hall effect sensor(s) 23. The control unit 25 can be implemented on the printed circuit board 24. The control unit 25 is connected to the Hall effect sensor(s) 23 for example via a printed circuit or via a wired connection or by wireless communication means known to the person skilled in the art. The control unit 25 is also configured to generate control signals from the determined angular position of the rotor 15. These control signals are used to power the electromagnetic excitation coils 9 of the stator 3 in order to drive the rotation of the rotor 15. Furthermore, the control unit 25 comprises a clock 26 and is configured to estimate the angular position of the rotor 15 between two changes of state of the signal or signals derived from the Hall effect sensor(s) 23.

Preferably, only the signals derived from a single Hall effect sensor 23 are used by the control unit 25 to estimate the intermediate angular positions to avoid inserting an error into the estimation due to positioning tolerances of the other Hall effect sensors 23. Thus, hereinafter in the description, a single Hall effect sensor 23 will be used to perform the estimation of the intermediate angular positions but it is also possible to use the signals derived from several Hall effect sensors 23 without departing from the scope of the present invention. The tolerance errors can thus be corrected by a calibration.

Furthermore, only the case where the control magnet 21 comprises one pair of magnetic poles will be described, but it is also possible to use a control magnet 21 comprising a greater number of pairs of magnetic poles without departing from the scope of the present invention.

FIG. 3a represents an example of a control magnet 21 mounted on the shaft 17 of the rotor 15 comprising a pair of magnetic poles and FIG. 3b represents the signal H derived from the Hall effect sensor 23 over time when the rotation speed of the rotor 15 supporting the control magnet 21 is constant. Two successive changes of state (the instants of the changes of state being referenced I0, I1 . . . I5) of the Hall effect sensor 23 correspond in this case to a rotation of 180° of the rotor 15.

To perform the estimation of the angular position of the rotor 15 between two changes of state of the signal H derived from a Hall effect sensor 23, the control unit 25 can estimate the rotation speed of the rotor 15 using, for example, two preceding changes of state of the signal H derived from the Hall effect sensor 23. Thus, from this estimated rotation speed, the angular position of the rotor 15 at each clock instant 26 can be estimated.

FIG. 4 represents an example of a graph representing the signal H derived from the Hall effect sensor 23 between the instants I0 and I2 of the changes of state of the Hall effect sensor 23 of FIG. 3a. At the instant I2, it is possible, from the instants I0 and I1 for example, to estimate the instant I3 corresponding to the next change of state, for example by considering that the time interval I2-I3 is equal to the time interval I0-I1 (assumption of a constant speed, an assumption which can often be accepted because of the inertia of the rotor 15). Furthermore, it is then possible to determine the angular position of the rotor 15 at the intermediate instants denoted i21 . . . i25 situated between the instants of the changes of state I2 and I3 (since the speed is considered constant between I2 and I3). The number of intermediate instants desired can be chosen and is limited only by the minimum increment of the clock 26. Thus, it is possible to obtain the position of the rotor 15 at instants very close together as with an accurate encoder and for a reduced cost. The angular position of the rotor 15 estimated at the different intermediate instants $i_{21}$ . . . $i_{25}$ then makes it possible to apply a sinusoidal control in the same way as with an accurate encoder. For that, the voltage values to be applied to the control signals for each angular position of the rotor 15 corresponding to the intermediate instants $i_{21}$ . . . $i_{25}$ can be saved in a database of the control unit 25. Alternatively, these values can be generated by the control unit 25 from a predetermined mathematical equation. Thus, the greater the number of intermediate instants chosen, the closer the control signal obtained will be to a sinusoidal signal. FIG. 4 represents an example of a control signal C obtained by considering the intermediate instants $i_{21}$ to $i_{25}$. In effect, the signal obtained is quasi-sinusoidal or substantially sinusoidal since a single value is applied to the control signal between two intermediate instants, but, if the duration between two intermediate instants $i_{21}$ . . . $i_{25}$ is sufficiently small, the control signal C obtained approximates a sinusoidal signal.

Furthermore, in order to enhance the accuracy of the estimation of the angular position of the rotor 15 at the intermediate instants $i_{21}$ . . . $i_{25}$, it is also possible to take account of several preceding instants I0, I1 . . . to take account of a change in the rotation speed over several time intervals between two changes of state. For example, in the case of FIG. 4, the estimation of I3 and of the intermediate points $i_{21}$ . . . $i_{25}$ can take account not only of the instants I0 and I1 but also of the preceding instants. A regression, for example a polynomial or hyperbolic regression or similar, can in particular be applied to determine a function corresponding to the change in the speed so as to determine the change in the speed between the instants I2 and I3. This determination is then repeated over time by taking account of the instants of the new changes of state, for example at each instant corresponding to a change of state of the signal H supplied by the Hall effect sensor 23. In this particular case, at the instant I3, the information corresponding to the interval I1-I2 will be able to be used (for example in combination with the interval I0-I1) to determine the instant I4 and the intermediate instants between I3 and I4.

Furthermore, by applying a time offset to the instants I1, I2 . . . and the intermediate instants $i_{21}$ . . . $i_{25}$, it is possible to create a phase advance of the sinusoidal control signal C created. FIG. 5 represents a diagram in which instants I'2 and I'3 are created by a time offset ΔT from the instants I2 and I3, which makes it possible also to obtain offset intermediate instants and therefore obtain a sinusoidal control signal C with a phase advance. This phase advance makes it possible to increase the torque supplied by the electric motor 1, the phase advance can be chosen as a function of the desired torque. The phase advance is for example applied when the rotation speed of the rotor 15 exceeds a predetermined threshold, here called second predetermined threshold, and/or the desired torque exceeds a predetermined threshold. The application of a control signal C with a phase advance therefore depends on the torque to be supplied.

Moreover, the estimation of the angular positions of the rotor 15 at the intermediate instants is not possible on start up, since there is no prior change-of-state signal to estimate the speed. Thus, on start up, the control unit 25 can be configured to control the electric motor 1 by a blockwise control as long as the rotation speed is below a first predetermined threshold, for example 10% of the maximum rotation speed of the rotor 15.

To perform this blockwise control, the control unit 25 can use the signal or the signals derived from the Hall effect sensor(s) 23. The electric motor 1 can for example comprise three Hall effect sensors 23 spaced apart from one another by 120° around a control magnet 21 comprising a pair of magnetic poles and supplying the angular position of the rotor 15 every 60° in order to determine the switching instants for the blockwise control or by using three Hall effect sensors and a control magnet 21 comprising three axial multipole layers arranged so as to allow a detection of the angular position of the rotor 15 every 60°.

Alternatively, a reduced number of Hall effect sensors 23, for example a single Hall effect sensor 23, can be used with a control magnet 21 comprising three pairs of poles in order to detect an angular position of the rotor every 60° and thus determine the switching instants.

Such a blockwise control allows a start up of the electric motor 1 with a significant torque. Such a possibility is important in the case where the electric motor 1 is used in a gear motor of a wiping device for a motor vehicle, particularly when the wiper blades adhere strongly to the windshield because of dirt or ice.

Then, when the rotation speed of the rotor 15 of the electric motor 1 exceeds the first predetermined threshold, the sinusoidal control as described previously is applied.

Such a sinusoidal (or quasi-sinusoidal) control makes it possible to obtain a significant torque at high speed and obtain a gentler operation and therefore limit the noise of the electric motor 1. The significant torque makes it possible to obtain a good operation of the wiping device even in the case of a dry windshield for example and the reduction of the noise emitted by the electric motor 1 makes it possible to improve the comfort of the passengers of the vehicle.

The present invention relates also to a gear motor in which the electric motor is coupled to a reducing mechanism and a wiping system using the electric motor 1 described previously, the output shaft of the reducing mechanism being, for example, linked to a windscreen wiper arm, possibly via a linkage assembly.

The present invention relates also to a method for controlling a brushless direct current electric motor 1. FIG. 6 represents the different steps of the method. Some steps can be optional and the order of the steps can also differ, some steps being able to be concurrent.

The preliminary step 100 relates to the saving of a mapping table between angular positions of the rotor 15 and associated control voltages for different controls of the electric motor 1. Alternatively, mathematical functions can be saved to make it possible to calculate the control voltages associated with the different positions of the rotor 15. Different mathematical functions can be associated with different controls of the motor 1 as a function of the desired rotation speed.

The first step 101 consists in establishing a blockwise control on start up of the electric motor 1 and up to a rotation speed of the electric motor 1 corresponding to a first predetermined threshold, for example 10% of the maximum rotation speed. The blockwise control is established by determining the angular position of the rotor 15 (and therefore the switching instants) from the signal derived from at least one Hall effect sensor 23, generally three Hall effect sensors 23.

The second step 102 relates to the estimation of the angular position of the rotor 15 at predetermined instants between two instants corresponding to the changes of state of a Hall effect sensor 23. Thus, in the case of an electric motor 1 comprising several Hall effect sensors 23, the signal derived from one of the Hall effect sensors 23 is selected and the angular position of the rotor 15 is estimated between the instants of change of state of the Hall effect sensor 23. This estimation is for example performed as soon as the electric motor 1 has reached a rotation speed corresponding to a predefined value below the threshold defined in the step 101, for example 8% of the maximum rotation speed. The estimation consists in estimating a rotation speed or a change in the rotation speed of the electric motor 1 from the instants of the preceding changes of state and applying the same rotation speed or the same change in the rotation speed to the time interval up to the instant of the next change of state of the signal H derived from the Hall effect sensor 23. This determination can be reiterated and updated on each new change of state of the Hall effect sensor 23. The estimation can also be done over a time interval corresponding to several changes of state of the signal derived from the Hall effect sensor 23, for example over a time interval of two changes of state corresponding to a rotation of 360° of the electric motor in the case of a control magnet comprising two magnetic poles. Thus, the rotation speed or change in the rotation speed estimated makes it possible to determine the angular position of the rotor 15 at each instant and in particular at selected predetermined instants.

The third step 103 relates to the determination of a voltage value associated with each selected predetermined instant. For that, the voltage values associated with the different positions of the rotor 15 to obtain a sinusoidal control signal C corresponding to the control of the electric motor 1 are saved in a memory of the control unit 25. Alternatively, these voltage values can be calculated by the control unit 25 from a mathematical function dependent on the angular position of the rotor 15. Different mathematical functions can be associated with different controls of the electric motor 1 as a function of the desired rotation speed for example.

The fourth step 104 relates to the generation of a pseudo-sinusoidal control signal C from the voltage values determined in the step 103. This control signal C generated is transmitted to the electromagnetic excitation coils 9 when the rotation speed of the rotor 15 of the electric motor 1 is above the first predetermined threshold to produce a revolving field and drive the rotor 15 in rotation.

The fifth step 105 is an optional step and relates to the generation of a substantially sinusoidal control signal C with a predetermined phase advance when the rotation speed of the rotor 15 exceeds a second predetermined threshold and/or when the torque to be supplied exceeds a predetermined value. The value of the phase advance can vary as a function of the rotation speed and/or of the torque to be supplied such that the greater the rotation and/or the torque to be supplied, the greater the phase advance. The phase advance is obtained by inserting a time offset at the level of the intermediate instants such that the voltage values determined in the step 103 are applied with an advance time ΔT as described previously from FIGS. 4 and 5.

Thus, such a control method makes it possible to obtain a high torque on start up and at high rotation speeds if necessary while obtaining a less noisy operation than with a blockwise control. Furthermore, such a method does not require costly additional equipment such as an accurate encoder.

The invention claimed is:

1. A brushless direct current electric motor for a wiping system, comprising:
    a rotor comprising a control magnet;
    a stator having electromagnetic excitation coils of the rotor;
    at least one Hall effect sensor configured to detect an angular position of the control magnet;
    a control unit connected to said Hall effect sensor and configured to determine at least one angular position of the rotor in relation to the stator from the signals from the Hall effect sensor and to generate control signals to power the electromagnetic excitation coils of the stator as a function of the determined angular position of the rotor,
    wherein the control unit comprises a clock and is configured to:
        estimate the angular position of the rotor at a plurality of predetermined instants lying between two changes of state of the Hall effect sensor from the instants of the preceding changes of state,
        determine values of the control voltages associated with the angular positions of the rotor estimated for the predetermined instants, and
        generate a sinusoidal or substantially sinusoidal control signal from the determined voltage values.

2. The electric motor according to claim 1, in which the control unit is configured to generate a blockwise control signal from the changes of state of the, at least one, Hall effect sensor for rotation speeds below a first predetermined threshold and to generate a substantially sinusoidal control signal for rotation speeds above the first predetermined threshold.

3. The electric motor according to claim 1, in which the control unit is configured to generate a sinusoidal control signal with a predetermined phase advance when the rotation speed exceeds a second predetermined threshold.

4. The electric motor according to claim 3, in which the first predetermined threshold corresponds to a rotation speed equal to 10% of the maximum rotation speed.

5. The electric motor according to claim 1, in which the control unit is configured to generate a sinusoidal control signal with a predetermined phase advance when the torque to be supplied is above a predetermined threshold.

6. The electric motor according to claim 1, comprising at least two Hall effect sensors and in which the control unit is configured to generate a substantially sinusoidal control signal from the signal supplied by just one of the Hall effect sensors.

7. A gear motor for a wiping system, comprising an electric motor according to claim 1 coupled to a reduction gear.

8. A wiping system for a motor vehicle, comprising a gear motor according to claim 7.

9. A method for controlling a brushless direct current electric motor for a wiping system, comprising:
  a rotor comprising a control magnet,
  a stator having electromagnetic excitation coils of the rotor,
  at least one Hall effect sensor configured to detect an angular position of the control magnet, and
  a control unit connected to said Hall effect sensor and configured to determine an angular position of the rotor in relation to the stator from the signals from the Hall effect sensor and to generate control signals to power the electromagnetic excitation coils of the stator as a function of the determined angular position of the rotor,
  the method comprising;
    estimating the angular position of the rotor at a plurality of predetermined instants lying between two changes of state of the Hall effect sensor from the instants of the preceding changes of state;
    determining the values of the control voltages associated with the angular positions of the rotor estimated for the predetermined instants; and
    generating a substantially sinusoidal control signal from the determined voltage values.

10. The control method according to claim 9, wherein estimation of the angular position of the rotor at a plurality of predetermined instants lying between two changes of state of the Hall effect sensor is performed from the instants of the two preceding changes of state of the Hall effect sensor assuming that the rotation speed is constant.

11. The control method according to claim 9, wherein estimation of the angular position of the rotor at a plurality of predetermined instants lying between two changes of state of the Hall effect sensor is performed from the instants of at least three preceding changes of state of the Hall effect sensor to take account of a change in the rotation speed of the rotor.

12. The control method according to claim 9, further comprising saving a mapping table between angular positions of the rotor and associated control voltages to obtain a substantially sinusoidal control signal, wherein determination of the values of the control voltages associated with the angular positions of the rotor comprises searching for these values in the saved mapping table.

13. The control method according to claim 12, in which the substantially sinusoidal control signal is generated with a predetermined phase advance when the rotation speed of the rotor exceeds a second predetermined threshold.

14. The control method according to claim 13, in which the control signal with a phase advance is obtained by introducing a time offset for the application of the determined control voltages.

15. The control method according to claim 9, in which the substantially sinusoidal control signal is generated with a predetermined phase advance when the torque to be supplied is above a predetermined threshold.

16. The control method of claim 9, further comprising, for rotation speeds below a first predetermined threshold, generating a blockwise control signal is from the changes of state of at least one Hall effect sensor and for rotation speeds above the first predetermined threshold, generating a substantially sinusoidal control signal from the signals derived from a single Hall effect sensor.

* * * * *